United States Patent [19]

Hansman

[11] Patent Number: 5,559,566
[45] Date of Patent: Sep. 24, 1996

[54] INTEGRAL READING GLASSES WITH NECKLACE SUPPORT

[76] Inventor: Donna Hansman, P.O. Box 314, Millry, Ala. 36558

[21] Appl. No.: 319,874

[22] Filed: Oct. 7, 1994

[51] Int. Cl.$^6$ .................................................. G02C 3/00
[52] U.S. Cl. ........................ 351/156; 351/116; 351/157
[58] Field of Search ................... 351/51, 52, 66, 351/103, 104, 105, 106, 111, 114, 116, 123, 140, 156, 157

[56] References Cited

U.S. PATENT DOCUMENTS

| | | | |
|---|---|---|---|
| 4,953,967 | 9/1990 | Somerville | 351/156 |
| 4,998,815 | 3/1991 | Lin | 351/106 |
| 5,032,017 | 7/1991 | Bollé et al. | 351/116 |
| 5,035,498 | 7/1991 | Bollé | 351/116 |
| 5,381,192 | 1/1995 | Canavan et al. | 351/111 |

FOREIGN PATENT DOCUMENTS

| | | | |
|---|---|---|---|
| 0196261 | 10/1986 | European Pat. Off. | 351/111 |
| 0571765A1 | 12/1993 | European Pat. Off. | 351/140 |

*Primary Examiner*—William L. Sikes
*Assistant Examiner*—James A. Dudek
*Attorney, Agent, or Firm*—Michael I. Kroll

[57] ABSTRACT

Reading neckglasses comprising a front piece used for reading when placed in front of the eyes of a person. A structure is for suspending the front piece about a neck of the person, so that the front piece will always be at hand for use by the person.

1 Claim, 2 Drawing Sheets

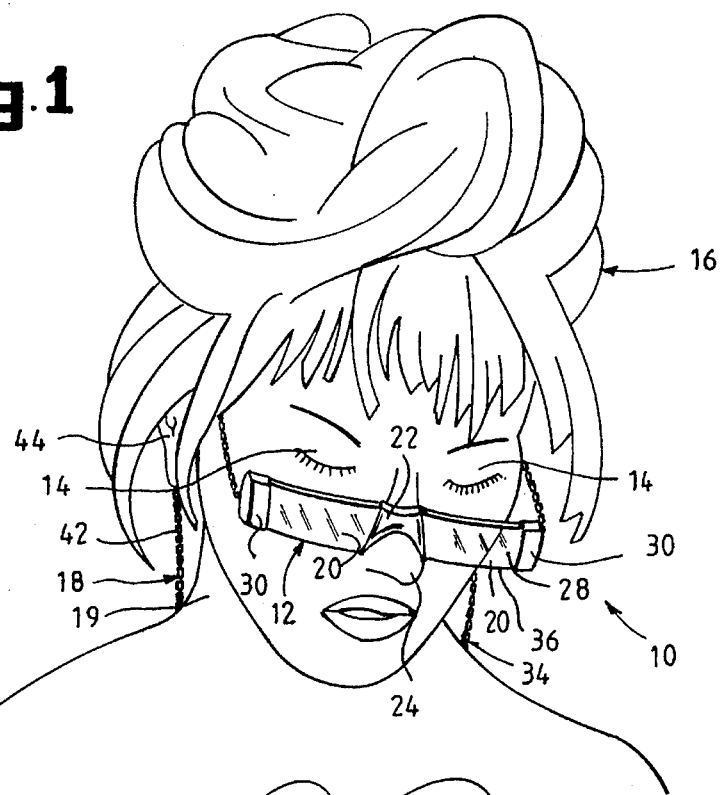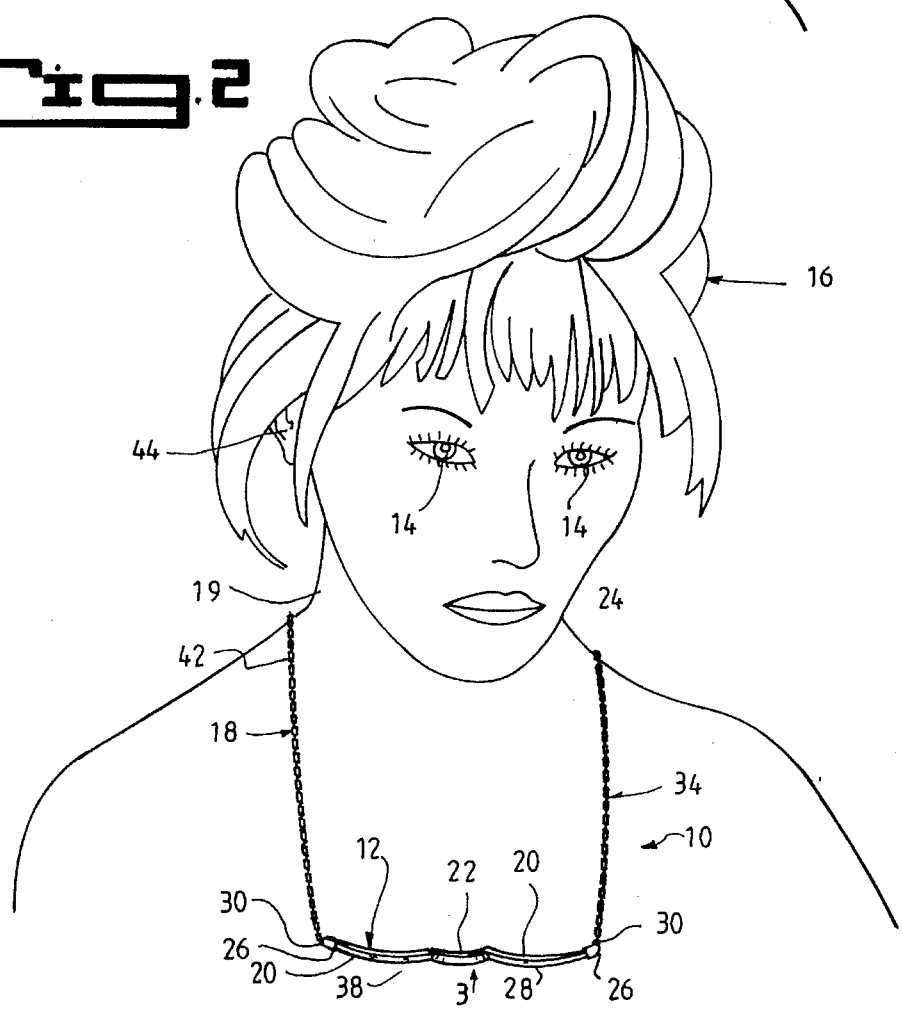

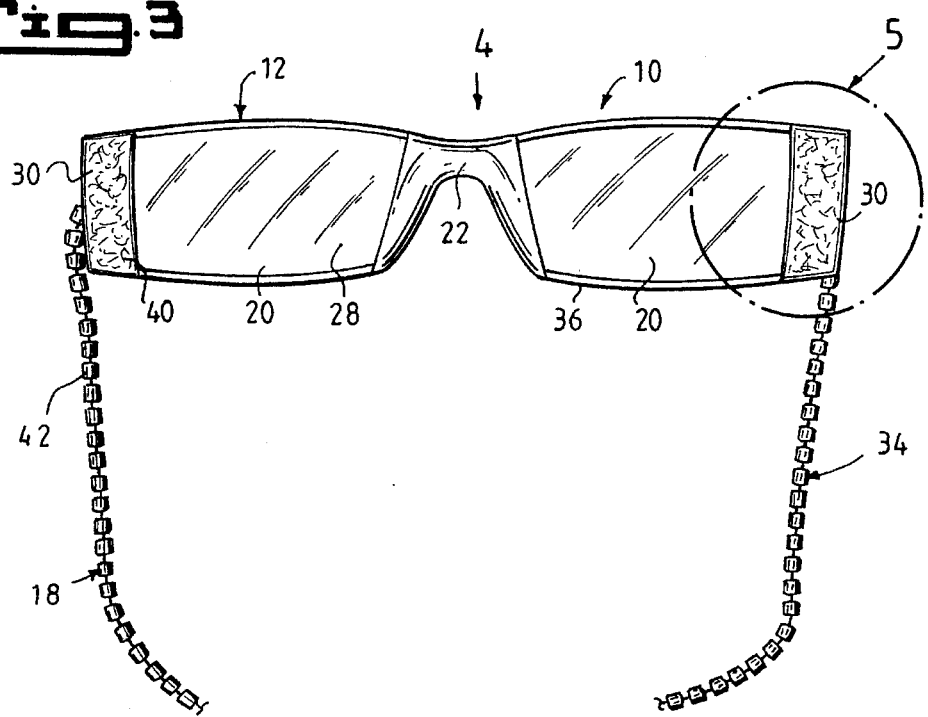
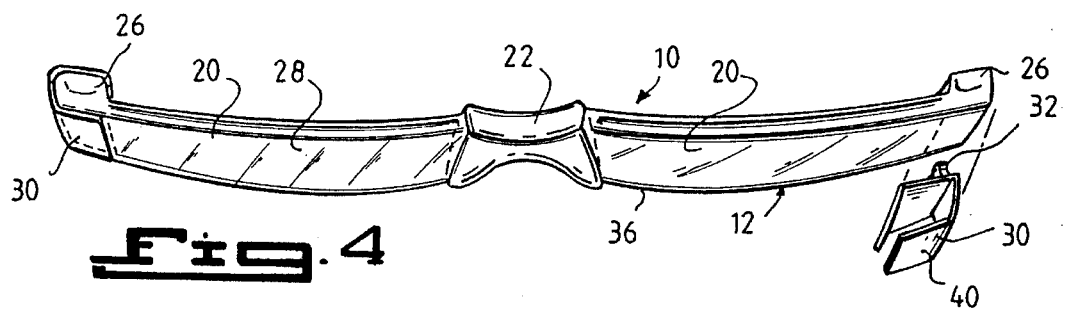
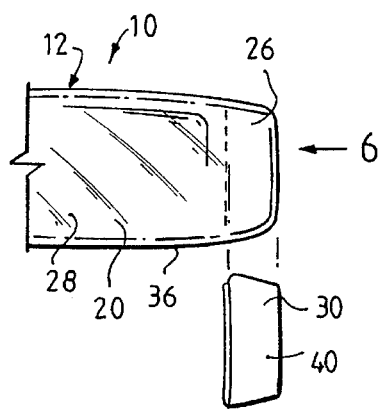
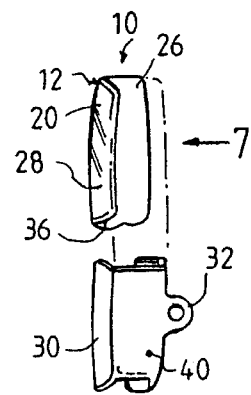
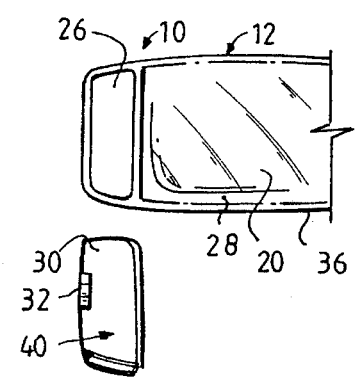

5,559,566

INTEGRAL READING GLASSES WITH NECKLACE SUPPORT

BACKGROUND OF THE INVENTION

1. Field of the Invention

The instant invention relates generally to reading glasses and more specifically it relates to reading neckglasses.

2. Description of the Prior Art

Numerous reading glasses have been provided in prior art that are adapted each contain a frame having a front with two hinged temples that can bend and break off during repeated usage. While these units may be suitable for the particular purpose to which they address, they would not be as suitable for the purposes of the present invention as heretofore described.

SUMMARY OF THE INVENTION

A primary object of the present invention is to provide reading neckglasses that will overcome the shortcomings of the prior art devices.

Another object is to provide reading neckglasses that does not have hinged templates or arms to break off of the glasses when a chain is used, which is placed about the neck of a person to prevent loss thereof.

An additional object is to provide reading neckglasses that is more comfortable to wear and is more attractive than regular reading glasses.

A further object is to provide reading neckglasses that is simple and easy to use.

A still further object is to provide reading neckglasses that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front perspective view showing the instant invention being worn by a person.

FIG. 2 is a front perspective view similar to FIG. 1, showing the instant invention removed and hanging down from the neck by the chain.

FIG. 3 is a front view of the instant invention per se taken in the direction of arrow 3 in FIG. 2, with the chain broken away.

FIG. 4 is a top perspective view taken in the direction of arrow 4 in FIG. 3, with the chain removed and one of the spring clips exploded therefrom.

FIG. 5 is a front view of a portion thereof as indicated by arrow 5 in FIG. 3, with the spring clip exploded therefrom.

FIG. 6 is a side view taken in the direction of arrow 6 in FIG. 5.

FIG. 7 is a rear view taken in the direction of arrow 7 in FIG. 6.

DETAILED DESCRIPTION OF THE PREFERRED EMBODIMENTS

Turning now descriptively to the drawings, in which similar reference characters denote similar elements throughout the several views, FIGS. 1 through 7 illustrate reading neckglasses 10, comprising a front piece 12 used for reading when placed in front of the eyes 14 of a person 16. A structure 18 is for suspending the front piece 12 about a neck 19 of the person 16, so that the front piece 12 will always be at hand for use by the person 16.

The front piece 12 includes a pair of narrow lenses 20, used to correct faulty vision of the person 16 when reading. A bridge 22 between the pair of narrow lenses 20 is to be placed upon a nose 24 of the person 16. A pair of side members 26 are also provided, with each located perpendicular on opposite free ends of the pair of narrow lenses 20. The pair of narrow lenses 20, the bridge 22 and the pair of side members 26 of the front piece 12 are all integrally formed from a transparent hardened abrasion resistant plastic material 28.

The suspending structure consists of a pair of generally C-shaped spring clamps 30, each having a rearwardly facing eyelet 32 formed thereon. Each spring clamp 30 is shaped to fit onto and be retained to each side member 26 of the front piece 12. A lanyard 34 has two ends which are each connected to one eyelet 32 on one spring clamp 30. The lanyard 34 will extend about the neck 19 of the person 16 and allow the front piece 12 to hang down in front of the person 16. A bottom edge 36 of the front piece 12 is against the chest 38 of the person 16 when not in use.

Each spring clamp 30 is fabricated out of a thin flexible non-corrosive metal material 40. The lanyard 34 is a decorative chain 42. The thin flexible non-corrosive metal material 40 of each spring clamp 30 can be brass or stainless steel. The narrow lenses 20 are made in strengths of 1.00 through 4.00 in quarter increments.

OPERATION OF THE INVENTION

To use the reading neckglasses, the following steps should be taken:

1. Place the decorative chain 42 about the neck 19 of the person 16.
2. Let the front piece 12 hang down in front of the person 16 with the bottom edge 36 of the front piece 12 against the chest 38 of the person 16.
3. Lift the front piece 12 and place the bridge 22 onto the nose 24 of the person 16 with the decorative chain 42 looped over the ears 44.
4. Look through the pair of narrow lenses 20 to read.
5. Replace the front piece 12 by sliding each spring clamp 30 off of its respective side member 26 and put a new front piece 12 in its place.
6. Replace the decorative chain 42 by sliding each spring clamp 30 off of its respective side member 26 and put a new decorative chain 42 in its place.

LIST OF REFERENCE NUMBERS 10 reading neckglasses
12 front piece
14 eye
16 person
18 suspending structure
19 neck of 16
20 narrow lens
22 bridge
24 nose of 16
26 side member on 20
28 transparent hardened abrasion resistant plastic material
30 C-shaped spring clamp 32 rearwardly facing eyelet on 30
34 lanyard
36 bottom edge of 12
38 chest of 16 p0 40 thin flexible non-corrosive metal material
42 decorative chain for 34
44 ear of 16

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Reading neckglasses comprising:

a) a front piece used for reading when placed in front of the eyes of a person, said front piece consisting of a pair of corrective lenses, a bridge between said lenses, and flat side pieces with a protruding side member on each side piece extending backwardly all formed by a single transparent hardened abrasion resistant plastic material integral member without a frame; and b) means for suspending said front piece about a neck of the person consisting of a pair of generally C-shaped spring clamps for sliding on and engaging said flat side pieces and surrounding said side members and each of said clamps having a rearwardly facing eyelet and a lanyard having two ends which are each connected to one said eyelet extending about the neck of said person, so that said front piece will always be at hand for use by the person, and permitting convenient replacement of said front piece and/or said lanyard.

\* \* \* \* \*